US008780791B2

United States Patent
Hou

(10) Patent No.: US 8,780,791 B2
(45) Date of Patent: Jul. 15, 2014

(54) METHOD AND APPARATUS FOR SYNCHRONIZING CARD WITHOUT TRAFFIC IN MULTI-CARD MULTI-STANDBY MOBILE TERMINAL

(75) Inventor: Qingzhu Hou, Shanghai (CN)

(73) Assignee: Spreadtrum Communications (Shanghai) Co., Ltd., Shanghai (CN)

( * ) Notice: Subject to any disclaimer, the term of this patent is extended or adjusted under 35 U.S.C. 154(b) by 472 days.

(21) Appl. No.: 13/104,761

(22) Filed: May 10, 2011

(65) Prior Publication Data

US 2012/0140709 A1 Jun. 7, 2012

(30) Foreign Application Priority Data

Dec. 6, 2010 (CN) .......................... 2010 1 0575410

(51) Int. Cl.
| | |
|---|---|
| H04B 7/212 | (2006.01) |
| H04J 3/06 | (2006.01) |
| H04W 4/00 | (2009.01) |
| H04W 56/00 | (2009.01) |
| H04W 36/00 | (2009.01) |
| H04W 88/06 | (2009.01) |
| H04L 12/66 | (2006.01) |
| H04J 3/14 | (2006.01) |

(52) U.S. Cl.
CPC .......... *H04W 56/0015* (2013.01); *H04W 36/00* (2013.01); *H04W 88/06* (2013.01); *H04L 12/66* (2013.01); *H04W 56/00* (2013.01); *H04J 3/14* (2013.01)
USPC ............................ 370/324; 370/350; 370/328

(58) Field of Classification Search
USPC ......................................... 370/324, 328, 350
See application file for complete search history.

(56) References Cited

U.S. PATENT DOCUMENTS

| 8,369,853 | B1* | 2/2013 | Sarkar et al. .................. 455/436 |
| 2002/0187804 | A1* | 12/2002 | Narasimha et al. ........... 455/552 |
| 2003/0007468 | A1* | 1/2003 | Joshi et al. .................... 370/335 |
| 2003/0224819 | A1* | 12/2003 | Sanchez ..................... 455/552.1 |
| 2005/0020286 | A1 | 1/2005 | Lazaridis et al. |
| 2006/0209762 | A1* | 9/2006 | Talmola et al. ............... 370/332 |
| 2008/0254803 | A1* | 10/2008 | Zalio ............................. 455/442 |
| 2010/0124929 | A1 | 5/2010 | Lee |

FOREIGN PATENT DOCUMENTS

| CN | 1976416 A | 6/2007 |
| CN | 101217737 A | 7/2008 |
| CN | 101217741 A | 7/2008 |

* cited by examiner

*Primary Examiner* — Noel Beharry
*Assistant Examiner* — Kodzovi Acolatse
(74) *Attorney, Agent, or Firm* — Kilpatrick Townsend & Stockton LLP

(57) ABSTRACT

A method and an apparatus for synchronizing card without traffic in multi-card multi-standby mobile terminal are disclosed. The method includes: receiving, by a non-traffic card, a synchronization channel signal from an adjacent network cell according to frequency point of a synchronization channel of the adjacent network cell prestored in the non-traffic card, when a traffic card is in traffic; if the receiving of the synchronization channel signal from the adjacent network cell fails, performing, by the non-traffic card, a full-frequency network searching after the traffic of the traffic card, for receiving a synchronization channel signal from a network cell of the network cells and establishing synchronization with the network cell corresponding to the synchronization channel signal. The method and apparatus avoid communication failures caused by the out-of-synchronization of non-traffic card during the traffic (i.e. service) of the traffic card.

10 Claims, 3 Drawing Sheets

METHOD AND APPARATUS FOR SYNCHRONIZING CARD WITHOUT TRAFFIC IN MULTI-CARD MULTI-STANDBY MOBILE TERMINAL

CROSS REFERENCE TO RELATED APPLICATIONS

The present application claims the priority of Chinese Patent Application No. 201010575410.0, entitled "Method and Apparatus for Synchronizing Card without Traffic in Multi-Card Multi-Standby Mobile Terminal", and filed on Dec. 6, 2010, the entire disclosure of which is incorporated herein by reference.

BACKGROUND OF THE INVENTION

1. Field of the Invention

The present invention relates to wireless communication field, more particularly, relates to method and apparatus for synchronizing card without traffic (i.e. non-traffic card) in multi-card multi-standby mobile terminal.

2. Description of Prior Art

The development of mobile communications provides mobile communication networks of various standard, such as the second-generation mobile communication system (2G): Global System for Mobile Communication (GSM), General Packet Radio System (GPRS), Enhanced Data rates for GSM service (EDGE) and Code Division Multiple Access (CDMA); the third-generation mobile communication system (3G): Universal Mobile Telecommunications System (UMTS, which is also called Wideband CDMA (WCDMA)), Time Division-Synchronous CDMA; and next generation mobile communication system: Long Term Evolution (LTE) and Worldwide Interoperability for Microwave Access (WIMAX).

Different types of wireless network are established in different time. Different wireless networks have different coverage areas. Different network operators provide different services and charge different fees. The development of communication technology is user-centered. Although there is no uniform standard in mobile network technology at present, users have a requirement that different SIM (Subscriber Identity Module) cards can work together in one cell phone, to use different network services from different network operators, which is technically achievable. And another requirement is that one cell phone has two SIM cards in the same network (for example, one SIM card is a local card, and the other is not a local card for business trips and travels).

Therefore, there appeared on market a type of cell phone which has two SIM cards in service. This type of cell phone, which saves money for a second cell phone, is easy to carry and use.

A dual-mode mobile station is disclosed in the US patent application with publication No. 2005/0020286A1. The dual-mode mobile station supports two kinds of mobile communication network, such as GSM, GPRS, CDMA and UMTS, etc. When the dual-mode mobile station receives services from different networks, information will be displayed on a main screen of the mobile station to notify the user the current network; and the user may select phone numbers and services according to the current network.

In addition, a dual-card dual-standby mobile telephone is disclosed in the Chinese patent application with publication No. CN1976516A. The mobile telephone includes a master unit and a slave unit. The master unit includes a host card slot, a host antenna, a host RF module as well as a host baseband processing module; the slave unit includes a slave card slot, a slave antenna, a slave radio frequency (RF) module as well as a slave baseband processing module. By the two sets of antennas, RF modules and baseband processing modules, two SIM cards can be in stand-by status simultaneously.

In a multi-card multi-standby cell phone (such as the above conventional dual-card dual-standby cell phone), when a SIM card (referred to as traffic card SIM-1) is in a voice service (i.e. in traffic), the other SIM card (referred to as non-traffic card SIM-2) which is in standby status may be out of synchronization because of (1) no data being received by the non-traffic card during this time period, (2) user being in a moving status; (3) poor wireless conditions; and (4) weak coverage of a network cell. The out-of-synchronization often causes the non-traffic card SIM-2 to drop from the network, after traffic card SIM-1 finishes the voice service.

Normally, when in idle mode, a cell phone is able to receive and demodulate the broadcast channel (BCH) signal transmitted from the network cell. There is a synchronization channel (SCH) signal in the BCH signal, which is used to adjust time sequence in the cell phone. The out-of-synchronization means that the cell phone is not synchronous with the network cell; working time of the cell phone is not coordinated with working time of the network cell; and the sending and receiving of the signal frame are not synchronous. Because of the out-of-synchronization results, effective signals can not be demodulated and communication can not be established.

SUMMARY OF THE INVENTION

The present invention is to solve the problem that in conventional multi-card multi-standby technologies, non-traffic card tends to be in out-of-synchronization status when traffic card is in traffic (i.e. in service), which causes the non-traffic card to drop from the network after the traffic card finishes the traffic.

To solve the above problem, from the first aspect of the present invention, there is provided a method for synchronizing non-traffic card in multi-card multi-standby mobile terminal, the mobile terminal being in a wireless communication system and the wireless communication system including a plurality of network cells, including: receiving, by a non-traffic card, a synchronization channel signal from an adjacent network cell according to frequency point of a synchronization channel of the adjacent network cell prestored in the non-traffic card, when a traffic card is in traffic; if the receiving of the synchronization channel signal from the adjacent network cell fails, performing, by the non-traffic card, a full-frequency network searching after the traffic of the traffic card, for receiving a synchronization channel signal from a network cell of the network cells and establishing synchronization with the network cell corresponding to the synchronization channel signal. Since the traffic card has to synchronize its own NCELL, and multi-card adds extra cells, there is provided the concept of priority; service cells of the non-traffic card have the same priority with the adjacent cells of the traffic card while the adjacent cells of the non-traffic card have lower priority; when performing the above receiving by a non-traffic card a synchronization channel signal, it is performed according to the priority of the cells and once every 30 seconds; and if the receiving can not be performed for all the adjacent network cells (adjacent cells), cells with high priority will be chosen to perform.

Optionally, receiving, by a non-traffic card, a synchronization channel signal from an adjacent network cell when a traffic card is in traffic includes: receiving the synchronization channel signal according to the frequency point of the synchronization channel of the adjacent network cell prestored in the non-traffic card; calculating a current time offset parameter and a current frequency offset parameter according to data of the received synchronization channel signal; and storing the time offset parameter and the frequency offset parameter, for establishing synchronization according to the time offset parameter and the frequency offset parameter by the non-traffic card after the traffic of the traffic card.

Optionally, the receiving of the synchronization channel signal from the adjacent network cell fails includes: the receiving of synchronization channel signals from all prestored adjacent network cells fail for a plurality of times continuously. A parameter of linkcounter is set here, which has an initial value of 6; each time of failure causes the linkcounter decreased by 2, and each time of success causes the linkcounter increased by 1; when the linkcounter is below 0, the receiving of the synchronization channel signal from the adjacent network cell is determined to be failed.

Optionally, the method further includes: setting the adjacent network cell from which the synchronization channel signal fails to be received as a non-synchronous cell; receiving of the synchronization channel signal from the non-synchronous cell is not to be performed.

Optionally, performing, by the non-traffic card, a full-frequency network searching for receiving a synchronization channel signal from a network cell of the network cells includes: measuring broadcast channel frequencies and power levels of network cells in a broadcast-channel-assignment-table of a current network cell of the traffic card; sorting the network cells corresponding to the power levels, according to power levels; and successively receiving synchronization channel signals on synchronization channels of the network cells according to sorting result of the network cells until a synchronization channel signal from a network cell of the network cells is received successfully, and establishing synchronization with the network cell for cell residence.

Optionally, establishing synchronization with the network cell includes: acquiring a current time offset parameter according to data of the received synchronization channel signal, and adjusting a local time slot of the mobile terminal to establish slot synchronization between the mobile terminal and the network cell corresponding to the synchronization channel signal; and estimating a current frequency offset parameter according to the data of the received synchronization channel signal, and adjusting a local frequency of the mobile terminal to make the local frequency within a standard range.

From the second aspect of the present invention, there is provided an apparatus for synchronizing non-traffic card in multi-card multi-standby mobile terminal, the mobile terminal being in a wireless communication system and the wireless communication system including a plurality of network cells, including: a signal reception unit, a determining unit, a control unit, a synchronization processing unit and a second synchronization processing unit; the signal reception unit being adapted to receive a synchronization channel signal according to frequency point of a synchronization channel of the adjacent network cell prestored in the non-traffic card, or to perform a full-frequency network searching; the determining unit being adapted to determine if the receiving of the synchronization channel signal from the prestored adjacent network cell by the signal reception unit or the receiving of a synchronization channel signal from a network cell by the signal reception unit during full-frequency network searching is successful; the control unit being adapted to control the signal reception unit to receive the synchronization channel signal from the adjacent network cell prestored in the non-traffic card when a traffic card is in traffic, or to control the signal reception unit to perform the full-frequency network searching after the determining unit determines that the receiving of the synchronization channel signal from the adjacent network cell prestored in the non-traffic card by the signal reception unit fails; the synchronization processing unit being adapted to establish synchronization between the non-traffic card and a network cell corresponding to the received synchronization channel signal, according to the synchronization channel signal from the adjacent network cell prestored in the non-traffic card received by the signal reception unit, or according to the synchronization channel signal from the network cell received by the signal reception unit during the full-frequency network searching.

Optionally, receiving, by the signal reception unit, a synchronization channel signal according to frequency point of a synchronization channel of the adjacent network cell prestored in the non-traffic card includes: receiving the synchronization channel signal according to the frequency point of the synchronization channel of the adjacent network cell prestored in the non-traffic card; calculating a current time offset parameter and a current frequency offset parameter according to data of the received synchronization channel signal; and storing the time offset parameter and the frequency offset parameter, for establishing synchronization according to the time offset parameter and the frequency offset parameter by the non-traffic card after the traffic of the traffic card.

Optionally, the receiving of the synchronization channel signal from the adjacent network cell prestored in the non-traffic card by the signal reception unit fails includes: the receiving of synchronization channel signals from all prestored adjacent network cells fail for a plurality of times continuously.

Optionally, the control unit is further adapted to set the adjacent network cell from which the synchronization channel signal fails to be received as a non-synchronous cell, and receiving of the synchronization channel signal from the non-synchronous cell is not to be performed.

Optionally, the synchronization processing unit includes: a power measurement unit, being adapted to measure broadcast channel frequencies and power levels of network cells in a broadcast-channel-assignment-table of a current network cell of the traffic card; a sorting unit, being adapted to sort the network cells corresponding to the power levels, according to power levels acquired by the power measurement unit, sorting result being for successively receiving synchronization channel signals by the signal reception unit; a calculation unit, being adapted to calculate a current time offset parameter and a current frequency offset parameter according to the synchronization channel signal received by the signal reception unit; and a synchronization unit, being adapted to adjust a local time slot of the mobile terminal according to the time offset parameter from the calculation unit, to establish slot synchronization between the mobile terminal and the network cell corresponding to the synchronization channel signal, and being adapted to adjust a local frequency of the mobile terminal according to the frequency offset parameter from the calculation unit, to make the local frequency within a standard range.

Optionally, the multi-card multi-standby mobile terminal is a dual-card dual-standby mobile terminal or a triple-card triple-standby mobile terminal.

In the above method and apparatus for synchronizing non-traffic card in multi-card multi-standby mobile terminal applied in a wireless communication system, when a traffic card of the mobile terminal is in traffic (i.e. service), a non-traffic card of the mobile terminal receives a synchronization channel signal on a synchronization channel of a prestored adjacent network cell periodically. If the receiving fails, after the traffic card finishes the traffic, a full-frequency network searching is performed. The full-frequency network searching is performed until a synchronization channel signal on a synchronization channel of a network cell of the network cells is received successfully. Synchronization is established with the network cell corresponding to the received synchronization channel signal, for cell residence.

In comparison with conventional technologies, the present invention has the following advantages:

If the receiving of synchronization channel signals from all prestored adjacent network cells fail, a full-frequency network searching is performed for the non-traffic card immediately after the traffic card finishes the traffic, which saves time compared with waiting drop from network after paging failure of the non-traffic card and reselecting network cell, and which decreases time of the out-of-synchronization with the network cell;

If the receiving of synchronization channel signals from all prestored adjacent network cells succeed during the traffic of the traffic card, the synchronization of clock and frequency between the non-traffic card and the corresponding network cell is guaranteed, which avoids drop from network caused by out-of-synchronization of the non-traffic card during the traffic of the traffic card.

DETAILED DESCRIPTION OF THE EMBODIMENTS

From the background, in conventional multi-card multi-standby cell phones, when a traffic card is in traffic (i.e. service), a non-traffic card in standby status may be out of synchronization because of poor wireless conditions or weak coverage of a network cell, which causes the non-traffic card to drop from the network.

Embodiments to which the present invention is applied are described in detail below. However, the invention is not restricted to the embodiments described below.

In the description of the present invention, a multi-card multi-standby mobile terminal is a multi-card multi-standby cell phone. In an embodiment of the present invention, multiple user identity cards in a multi-card multi-standby cell phone are within wireless network systems of the same standard. For example, the user identity card can be subscriber identity module (SIM) card in GSM system, universal subscriber identity module (USIM) card in UMTS system, removable user identity module (RUIM) card in CDMA2000 system, CDMA subscriber identity module (CSIM) card, or a wireless network card in a WLAN using IEEE 802.1 Ix. In addition, in another embodiment of the present invention, the multiple user identity cards in a multi-card multi-standby cell phone are within wireless network systems of different standards. For example, some user identity cards are SIM cards of GSM system, and some cards are USIM cards of UMTS system.

Figure 1:
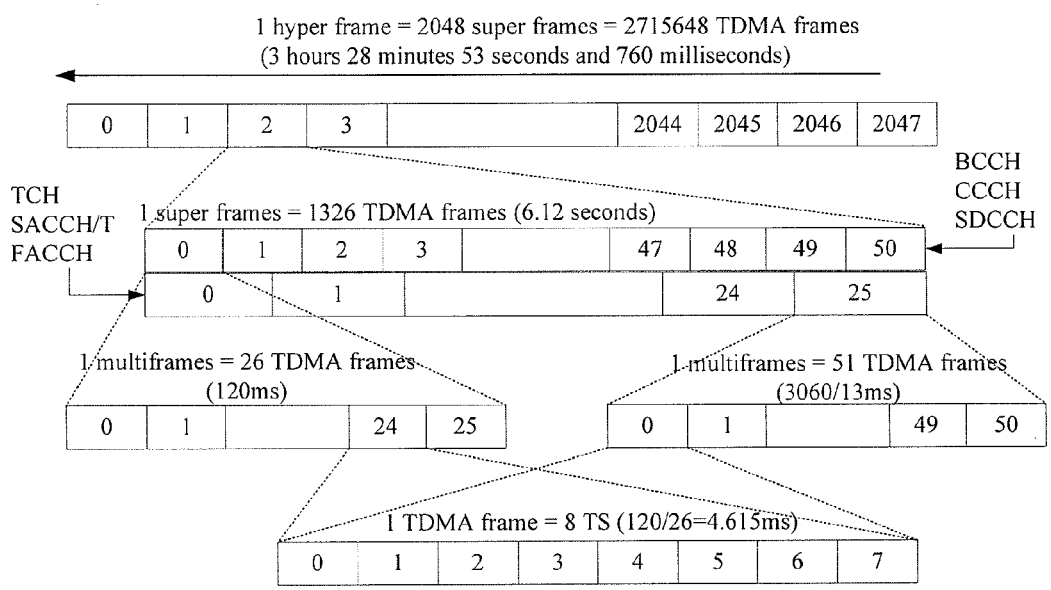
FIG. 1 is a schematic diagram of a frame structure on a physical channel in GSM system.

FIG. 1 is a schematic diagram of a frame structure on a physical channel in GSM system. The GSM system is a TDMA system. In TDMA system, a wireless carrier is divided into multiple time division channels; each user occupies one time slot, and receive (or send) signals only in the time slot.

Referring to FIG. 1, for a GSM system using TDMA, a TDMA frame on the bottom level of the frame structure includes 8 time slots (i.e. physical channel). Multiple TDMA frames constitute a single multiframe. There are two types of multiframe structures, one includes 26 successive TDMA frames, and the other includes 51 successive TDMA frames. The 26-frame multiframe is used in traffic frame and its associated control channel (ACCH), while the 51-frame multiframe is used in control channel. Multiple multiframes constitute a super frame which includes successive 51×26 TDMA frames; it means that a super frame can include 51 26-frame multiframes or 26 51-frame multiframes. Multiple super frames (2048 super frames) constitute a hyper frame, which is for encrypted voice and data.

Figure 2:
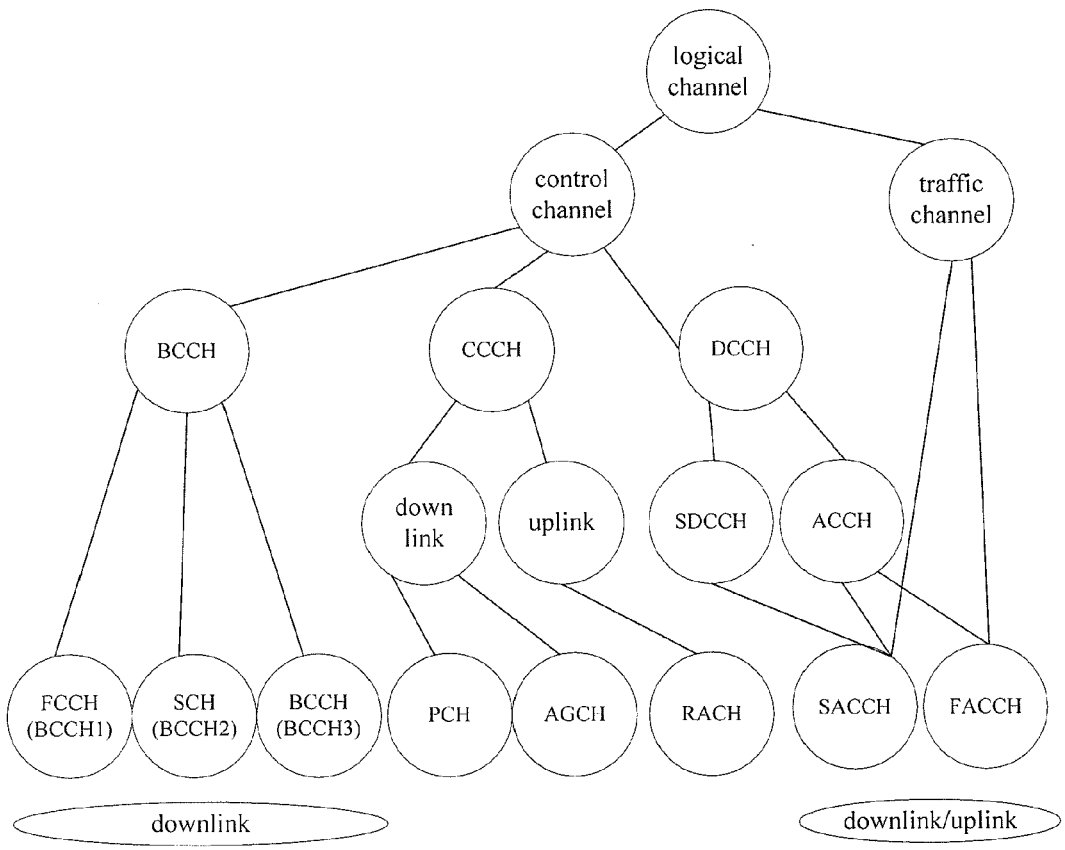
FIG. 2 is a schematic diagram of a hierarchy of logical channels in GSM system.

FIG. 2 is a schematic diagram of a hierarchy of logical channels in GSM system. Logical channel in GSM system can be divided into two types, one is traffic channel, and the other is control channel.

Traffic channels (TCH) carry coded voice or user data, for data exchange of voice service and data service. Control channels (CCH) are used to transmit control instructions or synchronous data. There are mainly three types of CCH: broadcast channel (BCH), common control channel (CCCH) and dedicated control channel (DCCH).

The BCH is only used as a downlink channel from a base station to a mobile terminal. There are three types of BCH: frequency correction channel (FCCH), synchronization channel (SCH) and broadcast control channel (BCCH). The FCCH carries information for adjusting frequency of a mobile station. The SCH carries information for a mobile terminal to perform frame synchronization and for a base transceiver station (BTS) to perform identification. The BCCH is used send broadcast system information to a mobile terminal.

The CCCH is used and shared by mobile terminals in the system. There are three types of CCCH, which are: paging channel (PCH), random access channel (RACH) and Access Grant Channel (AGCH). The PCH is used for paging a called mobile terminal. The RACH is used by a mobile terminal to apply for network access randomly. The AGCH is used by a mobile station to respond to the application for network access from the mobile terminal.

The DCCH is allocated to a mobile terminal by a base station. The DCCH is used to transmit signals between the mobile terminal and the base station. The DCCH can be divided into stand-alone dedicated control channel (SDCCH) and associated control channel (ACCH).

Normally, after power-on, a mobile terminal can be synchronized with a network cell by a cell search.

Figure 3:
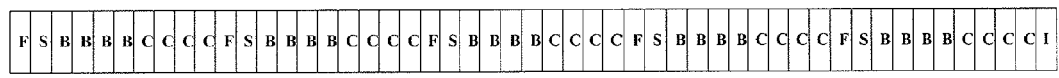
FIG. 3 is a schematic diagram of structure of a control multiframe in GSM system.

Currently, the method for acquiring synchronization timing of a cell mainly includes:

first, searching for frequency correction burst (FCB) on the main carrier frequency of the network cell, to determine the reception timing of the FCB sequence;

second, calculating the reception timing of the synchronization burst (SB) sequence, according to the relationship of reception timing between the FCB sequence and the SB sequence in the control multiframe structure of the GSM system;

the control multiframe structure is shown in FIG. 3, in which letter F stands for a TDMA frame of the FCB sequence, letter S stands for a TDMA frame of the SB sequence, letter B stands for a message block of BCCH, letter C stands for a message block of CCCH, and I stands for idle frame;

at last, receiving SB sequence according to the calculated reception timing, and decoding the SB sequence (SB signals include frame number information of the network cell), to acquire synchronization timing of the network cell.

For a multi-card multi-standby cell phone (such as a dual-card dual-standby cell phone or a triple-card triple-standby cell phone), when a SIM card is in a voice service, a standby SIM card (or standby SIM cards) tends to be in out-of-synchronization status because of poor wireless conditions or weak coverage of a network cell, which causes the non-traffic card to drop from the network after the traffic card finishes the traffic (i.e. service).

The invention provides a method and an apparatus for synchronizing non-traffic card in multi-card multi-standby mobile terminal, which avoid communication failures caused by the out-of-synchronization status of non-traffic card during the traffic (i.e. service) of the traffic card.

To facilitate description of the present invention, the multi-card multi-standby mobile terminal refers to a triple-card triple-standby cell phone in communication networks of the same standard (such as GSM system). However, in some embodiments, the number of the SIM cards can be two or more than three, and the SIM cards can be in communication networks of different standards.

Figure 4:
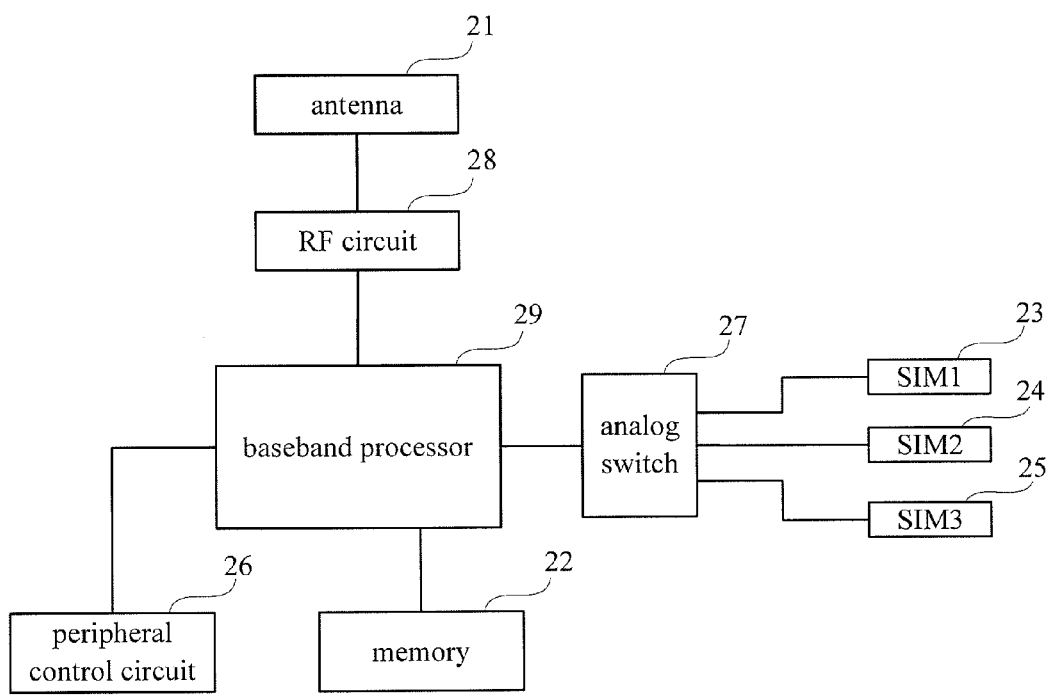
FIG. 4 is a schematic diagram of a hardware platform for a synchronization method in an embodiment of the present invention.

FIG. 4 is a schematic diagram of a hardware platform for a synchronization method in an embodiment of the present invention. Referring to FIG. 4, the hardware platform of a triple-card triple-standby cell phone includes: a GSM communication circuit, an antenna 21, a memory 22, three SIM card interface circuits and a peripheral control circuit 26. The SIM card interface circuits are SIM card interface circuit 23, SIM card interface circuit 24, and SIM card interface circuit 25. Based on a common GSM hardware platform 1, the hardware platform further includes an analog switch 27 controlled by software; the analog switch 27 is to switch among the SIM cards (which are SIM 1, SIM 2, SIM 3) corresponding to the three SIM card interface circuits. The GSM communication circuit includes a RF circuit 28 and a baseband processor 29. The RF circuit 28 includes a RF transceiver chip, a RF power amplifier and an antenna switch, in which the antenna switch is integrated into a front end module. The baseband processor 29 includes a GSM signal processor and a general-purpose embedded CPU; the GSM signal processor is a digital signal processing (DSP), and the general-purpose embedded CPU is the main chip of the baseband. The peripheral control circuit 26 includes a power module, a keyboard, an audio circuitry, and a LCD interface circuit. It should be noted that in the hardware platform of triple-card triple-standby cell phone in FIG. 4, three SIM cards share one set of hardware (such as the antenna, the RF circuit, the baseband processor, the peripheral control circuit and the memory). However, in some embodiments of the present invention, the hardware platform of a triple-card triple-standby cell phone can include three sets of hardware corresponding to the three SIM cards, in which the SIM 1 is a master card, and SIM 2 and SIM 3 are slave cards. The SIM 1 has its corresponding master interface circuit, master antenna, master RF circuit, master baseband processor, master peripheral control circuit and master memory; while SIM 2 and SIM 3 have their corresponding slave interface circuits, slave antennas, slave RF circuits, slave baseband processors, slave peripheral control circuits and slave memories.

Figure 5:
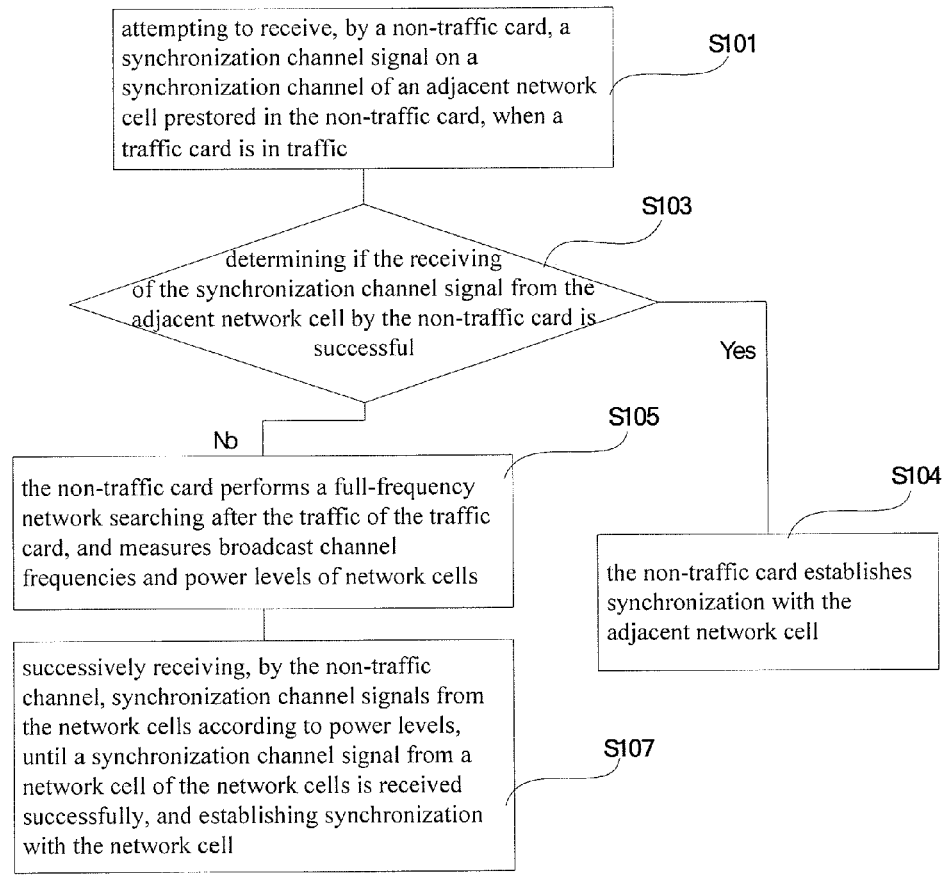
FIG. 5 is a flow chart of a synchronization method in another embodiment of the present invention.

FIG. 5 is a flow chart of a synchronization method in another embodiment of the present invention. Referring to FIG. 5, the method includes:

S101, attempting to receive, by a non-traffic card in a mobile terminal, a synchronization channel signal from an adjacent network cell according to frequency point of a synchronization channel of the adjacent network cell prestored in the non-traffic card, when a traffic card is in traffic.

As discussed above, in the embodiment, the multi-card multi-standby mobile terminal is a triple-card triple-standby cell phone applied in GSM system. The SIM card which is in traffic (i.e. in service, such as voice service), is named as traffic card, while other standby SIM cards are named as non-traffic card. The concept of traffic card and non-traffic card is related to service; therefore, at one moment, the three SIM cards may be all in standby status and all named non-traffic card; or at one moment, one SIM card is in traffic and is a traffic card, and the other two standby SIM cards are non-traffic cards.

In step S101, when the traffic card is in a voice service, the non-traffic card attempts to receive a synchronization channel signal on a synchronization channel from an adjacent network cell prestored in the non-traffic card. In the embodiment, before the traffic card starts the traffic, the memory in the mobile terminal stores an adjacent cell corresponding to the non-traffic card. When the traffic card is in traffic, the non-traffic card directly receives the synchronization channel signal on the synchronization channel of the adjacent network cell. The receiving, by the non-traffic card, the synchronization channel signal from the adjacent network cell when the traffic card is in traffic includes: receiving the synchronization channel signal according to the frequency point of the synchronization channel of the adjacent network cell prestored in the non-traffic card; calculating a current time offset parameter and a current frequency offset parameter according to data of the received synchronization channel signal; and storing the time offset parameter and the frequency offset parameter, for establishing synchronization according to the time offset parameter and the frequency offset parameter by the non-traffic card after the traffic of the traffic card. Therefore, the purpose of the above receiving process is to establish time and frequency synchronization, to acquire the time offset parameter and the frequency offset parameter, and to store the time offset parameter and the frequency offset parameter for the next receiving and synchronization. Specifically, different situations require different ways for the non-traffic card to receive the synchronization channel signal. For example: 1) for a synchronous network cell, the non-traffic card directly receives data of the SCH channel on idle frames of the traffic card, and calculates time offset and frequency offset with the SCH data; 2) for a current network cell that is not synchronous, the non-traffic card may search the FCCH on idle frames of the traffic card, then receive SCH data and calculate the time offset and frequency offset with the SCH data.

S103, determining if the receiving of the synchronization channel signal from the adjacent network cell by the non-traffic card is successful. If the receiving of the synchronization channel signal is successful, continue to perform step S104; in S104, after the traffic card finishes the voice service, the non-traffic card establishes synchronization with the adjacent network cell corresponding to the synchronization channel signal, and accesses the adjacent network cell after acquiring the system information of the network cell. If the receiving of the synchronization channel signal fails, continue to perform step S105. It should be noted that, in practice, the receiving of the synchronization channel signal from the adjacent network cell fails includes: the receiving of synchronization channel signals from all prestored adjacent network cells fail for a plurality of times continuously, i.e., (1) the receiving of synchronization channel signals from all prestored adjacent network cells fails in one time; (2) the receiving fails continuously for a plurality of times. The time number for attempting to receive the synchronization channel signals can be set to 3 in practice.

In addition, step S103 can further include: setting the adjacent network cell from which the synchronization channel signal fails to be received as a non-synchronous cell. The non-traffic card will not perform receiving of synchronization channel signal from non-synchronous cell.

In S105, after the receiving of the synchronization channel signal from the adjacent network cell fails, the non-traffic card performs a full-frequency network searching after the traffic of the traffic card. The non-traffic card measures broadcast channel frequencies and power levels of network cells which are included in a broadcast-channel-assignment-table of a current network cell of the traffic card. The current network cell of the traffic card is the network cell used currently by the traffic card.

In the embodiment, according to the GSM standard, the broadcast-channel-assignment-table (BCH assignment-table) can include BCH frequencies of up to 32 network cells. Therefore, the triple-card triple-standby cell phone can measure the power of each channel in the BCH assignment-table and generate a report for the current network cell. The report includes information related to the multiple network cells. In practice, the number of the network cells in the BCH assignment-table can be determined by the information of cell reuse pattern of spectrum allocation and distance from the current network cell. Normally, the number of the network cell is 6-10, and in the embodiment, the number is 6. The 6 network cells are selected form the BCH assignment-table with the largest power level. Network cells can be sorted according to their corresponding power levels.

S107, successively receiving, by the non-traffic channel, synchronization channel signals on synchronization channels of the network cells according to sorting result of the network cells, until a synchronization channel signal from a network cell of the network cells is received successfully, and establishing synchronization with the network cell corresponding to the synchronization channel signal.

In the embodiment, successively receiving, by the non-traffic channel, synchronization channel signals on synchronization channels of the network cells according to sorting result includes: according to the sorting result of the 6 network cells in the report, selecting the network cell which has the highest power level; if the receiving of the synchronization channel signal on the synchronization channel of the network cell which has the highest power level is successful, establishing synchronization with the network cell; if receiving of synchronization channel signal from the network cell which has the highest power level fails for a plurality of times continuously, selecting the network cell which has the second highest power level and attempting to receive a synchronization channel signal; . . . ; until a synchronization channel signal from a network cell of the network cells is received successfully, and establishing synchronization with the network cell.

The establishing synchronization with the network cell includes: acquiring a current time offset parameter according to data of the received synchronization channel signal, and adjusting a local time slot of the mobile terminal to establish slot synchronization between the mobile terminal and the network cell corresponding to the synchronization channel signal; and estimating a current frequency offset parameter according to the data of the received synchronization channel signal, and adjusting a local frequency of the mobile terminal to make the local frequency within a standard range. In this way, the information of the network cell is acquired, cell residence is achieved, and services from the network cell can be used.

Based on the above method for synchronizing non-traffic card in multi-card multi-standby mobile terminal, there is provided an apparatus for synchronizing non-traffic card in multi-card multi-standby mobile terminal.

Figure 6:
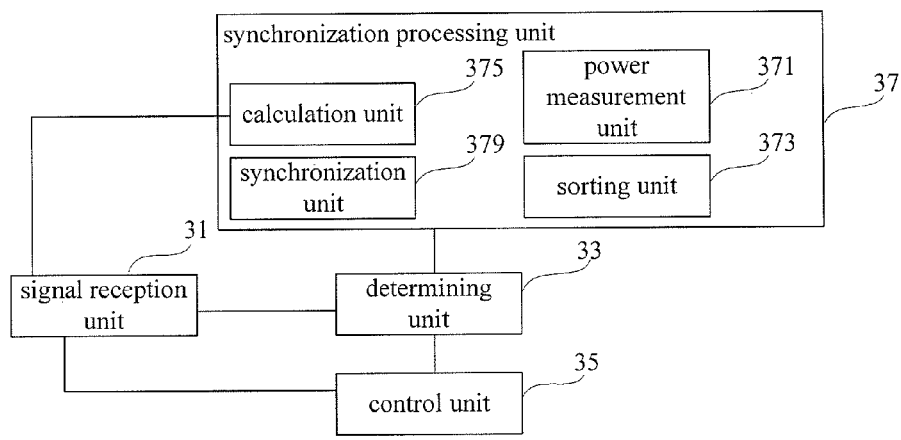
FIG. 6 is a schematic diagram of a synchronization apparatus in still another embodiment of the present invention.

FIG. 6 is a schematic diagram of a synchronization apparatus in still another embodiment of the present invention. Referring to FIG. 6, the apparatus for synchronizing non-traffic card in multi-card multi-standby mobile terminal includes: a signal reception unit 31, a determining unit 33, a control unit 35, and a synchronization processing unit 37. Specifically, the signal reception unit 31 is adapted to receive a synchronization channel signal according to frequency point of a synchronization channel of the adjacent network cell prestored in the non-traffic card, or to perform a full-frequency network searching; the determining unit 33 is adapted to determine if the receiving of the synchronization channel signal from the prestored adjacent network cell by the signal reception unit 31 or the receiving of a synchronization channel signal from a network cell by the signal reception unit 31 during full-frequency network searching is successful; control unit 35 is adapted to control the signal reception unit 31 to receive the synchronization channel signal from the adjacent network cell prestored in the non-traffic card when a traffic card is in traffic, or to control the signal reception unit 31 to perform the full-frequency network searching after the determining unit 33 determines that the receiving of the synchronization channel signal from the adjacent network cell prestored in the non-traffic card by the signal reception unit 31 fails; and the synchronization processing unit 37 is adapted to establish synchronization between the non-traffic card and a network cell corresponding to the received synchronization channel signal, according to the synchronization channel signal from the adjacent network cell prestored in the non-traffic card received by the signal reception unit 31, or according to the synchronization channel signal from the network cell received by the signal reception unit 31 during the full-frequency network searching.

The receiving, by the signal reception unit, a synchronization channel signal according to frequency point of a synchronization channel of the adjacent network cell prestored in the non-traffic card includes: receiving the synchronization channel signal according to the frequency point of the synchronization channel of the adjacent network cell prestored in the non-traffic card; calculating a current time offset parameter and a current frequency offset parameter according to data of the received synchronization channel signal; and storing the time offset parameter and the frequency offset parameter, for establishing synchronization according to the time offset parameter and the frequency offset parameter by the non-traffic card after the traffic of the traffic card.

Optionally, the receiving, by the signal reception unit 31, the synchronization channel signal from the adjacent network cell fails includes: the receiving of synchronization channel signals from all prestored adjacent network cells fail for a plurality of times continuously, i.e., (1) the receiving of synchronization channel signals from all prestored adjacent network cells fails in one time; and (2) the receiving fails continuously for a plurality of times. The time number for attempting to receive the synchronization channel signals can be set to 3 in practice.

Optionally, the control unit 35 is adapted to set the adjacent network cell from which the synchronization channel signal fails to be received as a non-synchronous cell. Receiving of the synchronization channel signal from the non-synchronous cell is not to be performed by the non-traffic card.

Optionally, the synchronization processing unit 37 includes: a power measurement unit 371, a sorting unit 373, a calculation unit 375, and a synchronization unit 377. The power measurement unit 371 is adapted to measure broadcast channel frequencies and power levels of network cells in a broadcast-channel-assignment-table of a current network cell of the traffic card. The sorting unit 373 is adapted to sort the network cells according to power levels acquired by the power measurement unit 371; the sorting result is used for successively receiving synchronization channel signals by the signal reception unit 31. The calculation unit 375 is adapted to calculate a current time offset parameter and a current frequency offset parameter according to the synchronization channel signal received by the signal reception unit 371.

The synchronization unit 377 is adapted to adjust a local time slot of the mobile terminal according to the time offset parameter from the calculation unit 375, to establish slot synchronization between the mobile terminal and the network cell corresponding to the synchronization channel signal, and is adapted to adjust a local frequency of the mobile terminal according to the frequency offset parameter from the calculation unit 375, to make the local frequency within a standard range.

In conclusion, in embodiments of the present invention, when a traffic card of the mobile terminal is in traffic, a non-traffic card of the mobile terminal attempts to receive a synchronization channel signal on a synchronization channel of a prestored adjacent network cell. If the receiving fails, after the traffic card finishes the traffic (i.e. service), a full-frequency network searching is performed by the non-traffic card. The full-frequency network searching is performed until a synchronization channel signal on a synchronization channel of a network cell of the network cells is received successfully. Synchronization is established with the network cell corresponding to the received synchronization channel signal. In comparison with conventional technologies, the present invention has the following advantages: If the receiving of synchronization channel signals from all prestored adjacent network cells fail, a full-frequency network searching is performed for the non-traffic card immediately after the traffic card finishes the traffic, which saves time compared with waiting the non-traffic card drop from network after paging failure and reselecting network cell, and which decreases time of the out-of-synchronization with the network cell; and if the receiving of synchronization channel signals from all prestored adjacent network cells succeed during the traffic of the traffic card, the synchronization of clock and frequency between the non-traffic card and the corresponding network cell is guaranteed, which avoids drop from network caused by out-of-synchronization of the non-traffic card during the traffic of the traffic card.

Although the present invention has been illustrated and described with reference to the preferred embodiments of the present invention, those ordinary skilled in the art shall appreciate that various modifications in form and detail may be made without departing from the spirit and scope of the invention.

What is claimed is:

1. A method for synchronizing non-traffic card in multi-card multi-standby mobile terminal, the mobile terminal being in a wireless communication system and the wireless communication system including a plurality of network cells, and the mobile terminal having a single antenna, the method comprising:
   when a traffic card has traffic, receiving, by a non-traffic card, a synchronization channel signal from an adjacent network cell according to a frequency point of a synchronization channel of the adjacent network cell which is pre-stored in the non-traffic card;
   if the receiving of the synchronization channel signal from the adjacent network cell fails, performing, by the non-traffic card, a full-frequency network search to obtain a synchronization channel signal from at least one network cell of the network cells and establishing synchronization with the at least one network cell corresponding to the obtained synchronization channel signal directly after the traffic card finishes transmitting its traffic, and the non-traffic card is no longer receiving the synchronization channel signal from the failed adjacent network cell,
   wherein the non-traffic card performing full-frequency network searching for receiving a synchronization channel signal from at least one network cell of the network cells comprises:
   measuring broadcast channel frequencies and power levels of network cells in a broadcast-channel-assignment-table of a current network cell of the traffic card;
   sorting the network cells corresponding to the power levels, according to power levels; and
   successively receiving synchronization channel signals on synchronization channels of the network cells according to sorting result of the network cells until a synchronization channel signal from a network cell of the network cells is received successfully, and establishing synchronization with the network cell for cell residence.

2. The method of claim 1, wherein receiving, by a non-traffic card, a synchronization channel signal from an adjacent network cell when a traffic card is in traffic includes:
   receiving the synchronization channel signal according to the frequency point of the synchronization channel of the adjacent network cell pre-stored in the non-traffic card;
   calculating a current time offset parameter and a current frequency offset parameter according to data of the received synchronization channel signal; and
   storing the time offset parameter and the frequency offset parameter, for establishing, by the non-traffic card, synchronization according to the stored time offset parameter and the frequency offset parameter after the traffic of the traffic card.

3. The method of claim 1, wherein failure of the receiving of the synchronization channel signal from the adjacent network cell includes continuously failing to receive synchronization channel signals from all pre-stored adjacent network cells fails for a set number of times.

4. The method of claim 1, further comprising:
   setting the adjacent network cell, from which the synchronization channel signal fails to be received, as a non-synchronous cell, wherein receiving of the synchronization channel signal from the non-synchronous cell is not performed.

5. The method of claim 1, wherein establishing synchronization with the network cell includes:

acquiring a current time offset parameter according to data of the received synchronization channel signal, and adjusting a local time slot of the mobile terminal to establish slot synchronization between the mobile terminal and the network cell corresponding to the synchronization channel signal; and estimating a current frequency offset parameter according to the data of the received synchronization channel signal, and adjusting a local frequency of the mobile terminal to make the local frequency within a standard range.

6. An apparatus for synchronizing non-traffic card in multi-card multi-standby mobile terminal, the mobile terminal having a single antenna and the mobile terminal being in a wireless communication system and the wireless communication system including a plurality of network cells, comprising:

a processor coupled with memory, the memory comprising a signal reception unit, a determining unit, a control unit, a synchronization processing unit and a second synchronization processing unit; wherein the signal reception unit configured to receive a synchronization channel signal according to frequency point of a synchronization channel of the adjacent network cell prestored in the non-traffic card, or to perform a full-frequency network searching;

the determining unit configured to determine if the receiving of the synchronization channel signal from the prestored adjacent network cell by the signal reception unit or the receiving of a synchronization channel signal from a network cell by the signal reception unit during full-frequency network searching is successful;

the control unit configured to control the signal reception unit to receive the synchronization channel signal from the adjacent network cell pre-stored in the non-traffic card when a traffic card is in traffic, or to control the signal reception unit to perform the full-frequency network searching directly after the determining unit determines that the receiving of the synchronization channel signal from the adjacent network cell pre-stored in the non-traffic card by the signal reception unit has failed, and the signal reception unit is no longer receiving the synchronization channel signal from the failed adjacent network cell;

the synchronization processing unit configured to establish synchronization between the non-traffic card and a network cell corresponding to the received synchronization channel signal, according to the synchronization channel signal from the adjacent network cell pre-stored in the non-traffic card received by the signal reception unit, or according to the synchronization channel signal from the network cell received by the signal reception unit during the full-frequency network searching;

wherein the synchronization processing unit includes:

a power measurement unit configured to measure broadcast channel frequencies and power levels of network cells in a broadcast-channel-assignment-table of a current network cell of the traffic card;

a sorting unit configured to sort the network cells corresponding to the power levels, according to power levels acquired by the power measurement unit, sorting result being for successively receiving synchronization channel signals by the signal reception unit;

a calculation unit configured to calculate a current time offset parameter and a current frequency offset parameter according to the synchronization channel signal received by the signal reception unit; and a synchronization unit configured to adjust a local time slot of the mobile terminal according to the time offset parameter from the calculation unit, to establish slot synchronization between the mobile terminal and the network cell corresponding to the synchronization channel signal, and configured to adjust a local frequency of the mobile terminal according to the frequency offset parameter from the calculation unit, to make the local frequency within a standard range.

7. The apparatus of claim 6, wherein receiving, by the signal reception unit, a synchronization channel signal according to frequency point of a synchronization channel of the adjacent network cell pre-stored in the non-traffic card includes:

receiving the synchronization channel signal according to the frequency point of the synchronization channel of the adjacent network cell pre-stored in the non-traffic card;

calculating a current time offset parameter and a current frequency offset parameter according to data of the received synchronization channel signal; and storing the time offset parameter and the frequency offset parameter, for establishing synchronization according to the time offset parameter and the frequency offset parameter by the non-traffic card after the traffic of the traffic card.

8. The apparatus of claim 6, wherein failure of the receiving of the synchronization channel signal from the adjacent network cell pre-stored in the non-traffic card by the signal reception unit fails includes continuously failing to receive synchronization channel signals from all pre-stored adjacent network cells fail for a set number of times.

9. The apparatus of claim 6, wherein the control unit is further configured to set the adjacent network cell from which the synchronization channel signal fails to be received as a non-synchronous cell, and wherein receiving of the synchronization channel signal from the non-synchronous cell is not performed.

10. The apparatus of claim 6, wherein the multi-card multi-standby mobile terminal comprises one or more of: a dual-card dual-standby mobile terminal and a triple-card triple-standby mobile terminal.

\* \* \* \* \*